United States Patent [19]

Dijaux et al.

[11] Patent Number: 4,725,919
[45] Date of Patent: Feb. 16, 1988

[54] LUMINOUS PANEL FOR THE BATTERY MOUNTING OF COMPONENTS OF AIRBORNE EQUIPMENT

[75] Inventors: Jean-Marc Dijaux, Marignane; Gérard Jamet, Valence; Jean-Marie Jourdan, Marignane, all of France

[73] Assignee: Crouzet, Paris, France

[21] Appl. No.: 885,213

[22] Filed: Jul. 14, 1986

[30] Foreign Application Priority Data

Jul. 15, 1985 [FR] France ................ 85 10923

[51] Int. Cl.⁴ .................... H02B 1/02; H01H 9/00
[52] U.S. Cl. .................... 361/346; 361/331; 361/397; 200/310; 200/313
[58] Field of Search ........... 361/331, 332, 334, 346, 361/350, 397; 200/310, 313, 314, 317

[56] References Cited

U.S. PATENT DOCUMENTS

| | | | |
|---|---|---|---|
| 2,890,445 | 6/1959 | Korry | 340/378 |
| 4,022,993 | 5/1977 | Shattuck | 200/313 |
| 4,177,497 | 12/1979 | McCook et al. | 361/331 |
| 4,501,937 | 2/1985 | Anderson et al. | 200/310 |

FOREIGN PATENT DOCUMENTS 2231077 12/1974 France .
2467727 4/1981 France .

*Primary Examiner*—Robert S. Macon
*Attorney, Agent, or Firm*—Stevens, Davis, Miller & Mosher

[57] ABSTRACT

A light panel for the electrical mounting of components of airborne equipment is disclosed and comprises a first rigid plate having a plurality of holes for allowing component operating knobs to pass therethrough, a plurality of rings for individually guiding the knobs as well as holding components associated with the knobs in a fixed position, a printed circuit board having holes corresponding to like holes in the rigid plate and including conducting tracks for supplying electric power to microlamps which illuminate the knobs, and an insulating support plate for supporting component housings and electrically connecting the components to electrical conductors.

1 Claim, 3 Drawing Figures

LUMINOUS PANEL FOR THE BATTERY MOUNTING OF COMPONENTS OF AIRBORNE EQUIPMENT

BACKGROUND OF THE INVENTION

The present invention relates to a luminous panel for the electrical mounting of modular components, and specifically to manually controlled circuit breakers for aircraft equipment for the centralized control and protection of the electric installation on board.

In this application and in particular for piloting stations of helicopters, the circuit breaker panels, as most of the other instruments on board, are grouped together with a high mounting density in the restricted space of a central console, where they are visible and within reach of the pilots so that monitoring and handling of the equipment, particularly during night flights, are maximally facilitated.

Since working aircraft requires rapid, inexpensive replacement of defective or questionable equipment components, the method of mounting and connecting them as well as their accessibility behind the panels which cover them must facilitate to a maximum the interventions of the ground maintenance staff at the very places where they are used.

SUMMARY OF THE INVENTION

Thus, within the scope of the invention and with the purpose of obtaining the maximum density of circuit breakers on their support and presentation panel, it was first necessary to move the label identifying the function of each circuit breaker from the panel where it was previously situated, to the manual control knob of the circuit breaker itself. In addition, to make this identification readable in the dark, lighting for each circuit breaker has been provided by integrating in the manual control knob means for propagating the light coming from nearby sources integrated in the front of the panel. To this end, circuit breakers whose manual control member was the traditional push-pull type have been modified to operate in the known mode of push-push type.

Control button lighting of each of the circuit breakers is thus obtained partly by reflection of light emitted by a source (for example a microlamp) on a metal fixing plate, present on the upper shoulder of the circuit breaker, and partly by direct lighting. Before reaching the translucent part of the label, the light is conveyed by the control knob molded from a transparent plastic material (for example from a polycarbonate) and is slightly dulled on the upper face where the label is fixed by a resilient glass.

When the circuit breaker is set the control button is flush with the panel and only the label (possibly illuminated in darkness) is visible by the pilot. However, when, the circuit breaker is tripped, whether voluntarily by the pilot or spontaneously following a defect on the protected line, the control knob projects out from the panel and a ring of white color appears on the periphry of the knob. This efficiently signals the state of the electric protection devices on the aircraft to the pilot.

In this tripped position the label and the white ring may be illuminated in the dark. The electric connection of the circuit breakers is provided by fitting their terminals of the tongue type on modular connectors containing resilient connection clips, of a flattened shape, which are themselves connected either to a common power supply bus bar or to the different conducting wires of the distribution network.

The connection clips are of a known type called "safety" comprising a resilient stud which allows them to be locked by simple snap fitting inside individual recesses formed for this purpose in the connectors.

These clips may be readily unlocked and removed from their respective recess by means of a specific tool which the repairer may introduce either from the front or from behind the connector.

BRIEF DESCRIPTION OF THE DRAWINGS

The following description illustrates by way of non limitative example the different characteristic aspects of the invention with reference to the accompanying drawings.

DESCRIPTION OF THE PREFERRED EMBODIMENT

Figure 1:
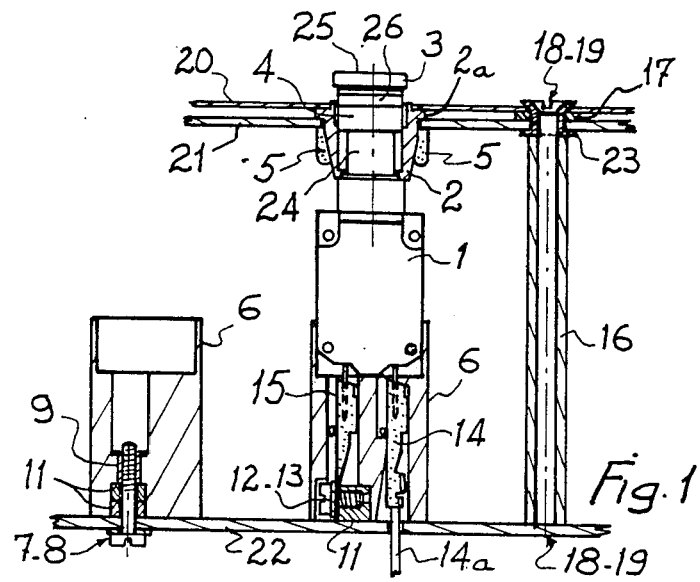
FIG. 1 shows in side elevation and in partial section a fragmentary view of the circuit breaker support panel, in which the arrangement of the component elements is in conformity with the invention.
Figure 3:
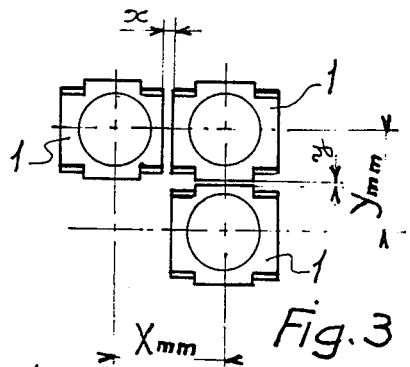
FIG. 3 shows schematically the "grid" for implantation at the standardized pitch of the circuit breakers in the panel of the invention.
Figure 2:
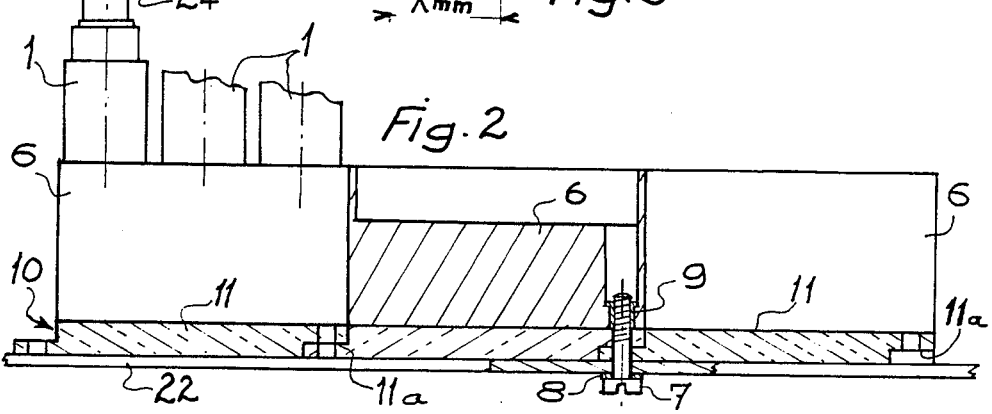
FIG. 2 shows in side elevation perpendicular to that of FIG. 1 a view of the modular interconnection elements such as they are mutually arranged and fixed to the bottom of the panel of FIG. 1.

Referring to the accompanying Figures, the circuit breaker panel of the invention is an assembly comprising the following elements:

1. a front panel in the form of a thin and rigid metal plate 20, perforated with a plurality of holes for the passage of dimmer caps or translucent control knobs 4 for controlling the circuit breakers 1 and spaced from each other in accordance with an implantation "grid" shown schematically in FIG. 3, 2. plastic molded rings 2 for individually guiding the translucent control knobs 4 and holding each of the circuit breakers 1 in a fixed position, and 3. a printed circuit board 21, perforated like the rigid metal plate 20, keep the conducting tracks for supplying electric power to the microlamps 5 mounted on printed circuit board 21, in the vicinity of the passage holes for the translucent control knobs 4.

These three elements are assembled for example by the means of tubular rivets 23 and spacer rings 17, forming an indissociable element in the form of a board which can be removed as a single unit. Convenient access to the circuit breakers 1 results from this configuration, allowing individual replacement by simply unplugging.

As shown in the drawings, rings 2 for guiding the translucent control knobs 4 are provided with a collar 2a intended to retain them between the external metal plate 20 and the printed circuit board 21 forming the removable front panel. Moreover, the skirt of the rings 2 has lateral windows conveying the light emitted by the microlamps 5 towards the translucent control knob 4.

In addition to the above elements, the panel of the invention further comprises modular connecting housings 6 molded from an insulating plastic material of dimensions such that their mounting juxtaposition, on a rear support plate 22, is determined by the millimetric mesh X-Y of the network of implantation of the juxtaposed circuit breakers on the panel.

Connecting housings 6 are provided with several pairs of recesses (3 for example) intended to receive safety-type connection clips 14 and 15 for the bipolar mounting of the tongue terminals of the circuit breakers 1. Clips, corresponding to the termination of the connecting conductor 14a at each of the protected circuits, are locked to the connecting housing 6 by snap fitting in their respective recesses, through a small, resiliently retractable tongue.

Clips 15, corresponding to the ground connection common to the assembly of the circuits protected by each of the circuit breakers 1, are fixed by locking screws 12, 13 to a modular bus bar 10 formed by a succession of conducting segments 11 incorporated in a lateral groove provided at the lower part of each connecting housings 6. Mechanical and electric connection resulting from fitting together the ends of the successive conducting segments 11 forming the bus bar 10, as well as their individual mechanical fixing with the connecting housings 6 to the insulating rear support plate 22, is provided simultaneously by screws 7 locked by a washer 8 after screwing into the threaded socket 9 at the bottom of a recess provided at one of the ends of the modular connecting housings 6.

The assembly of the elements of the structure comprising the rear support plate 22, the removable front metal plate 20, and the printed circuit board 21 is interlocked by a suitable number of spacer posts 16 each end of which is provided with screws 18 locked by resilient washers 19.

Each of the circuit breakers 1 of the panel is provided with a translucent control knob 4, held by resilient locking at the end of a control member 24. This control knob is made of a translucent knob 4 intended to direct and diffuse towards a label 25 the light from the microlamps 5 through the lateral windows of ring 2. Label 25 carrying functional translucent indications is held in position by the end of the translucent knob 4 by a resiliently locked glass 3.

A white ring 26 held in place by glass 3 on the knob 4 serves as visual indication of the tripping state of the circuit breaker when the knob 4 of the control member 24 projects from metal plate 20.

Naturally, the scope of the invention is not limited to the description which has just been made. For example, each of the circuit breakers such as 1 may be replaced by any type of switching element with axial control.

What is claimed is:

1. A luminous panel for the electrical mounting of modular components on a removable front plate comprising:
    a rigid plate containing a plurality of holes therein for permitting passage therethrough of tranlucent knobs, said knobs being associated with a plurality of modular components, arranged in a pattern;
    a printed circuit board in parallel with said rigid plate and containing holes aligned with the holes of said rigid plate, said printed circuit board being securely associated with said rigid plate and having a plurality of conducting tracks for supplying electric power to a plurality of microlamps which illuminate said translucent knobs; and,
    a plurality of modular connecting housings, positioned on an insulating rear support plate and incorporating means for electric connection of said plurality of modular components to respective functional circuits;
    said modular connecting housings being positioned on a modular section of a connecting bus bar common to an assembly of said functional circuits.

* * * * *